US008122776B2

United States Patent
Fox

(10) Patent No.: US 8,122,776 B2
(45) Date of Patent: Feb. 28, 2012

(54) HANDHELD VACUUM TEST FIXTURE AND METHOD OF MONITORING VACUUM CUP DIFFERENTIAL PRESSURE

(76) Inventor: Michael A. Fox, Harrison Township, MI (US)

( * ) Notice: Subject to any disclaimer, the term of this patent is extended or adjusted under 35 U.S.C. 154(b) by 306 days.

(21) Appl. No.: 12/483,622

(22) Filed: Jun. 12, 2009

(65) Prior Publication Data

US 2009/0308139 A1   Dec. 17, 2009

Related U.S. Application Data

(60) Provisional application No. 61/061,331, filed on Jun. 13, 2008.

(51) Int. Cl.
*G01L 5/00* (2006.01)
*G01L 19/14* (2006.01)
*G01M 3/02* (2006.01)

(52) U.S. Cl. ............... 73/862.581; 73/49.8; 73/862.03; 73/862.53

(58) Field of Classification Search ............. 73/40–49.8, 73/862.03, 862.53, 562.581, 865.9
See application file for complete search history.

(56) References Cited

U.S. PATENT DOCUMENTS

| | | |
|---|---|---|
| 2,128,200 A | 8/1938 | Allen |
| 2,383,936 A | 9/1945 | Hohl |
| 2,660,053 A | 11/1953 | Buehner |
| 2,694,924 A | 11/1954 | Matlock et al. |
| 3,043,129 A * | 7/1962 | King .................................. 73/40 |
| 3,524,342 A * | 8/1970 | Hobbs .............................. 73/40 |
| 3,748,905 A | 7/1973 | Fletcher et al. |
| 3,982,421 A * | 9/1976 | Wallace ............................ 73/40 |
| 4,002,055 A * | 1/1977 | Kops ............................... 73/40 |
| 4,010,840 A | 3/1977 | Eberle |
| 4,109,513 A * | 8/1978 | Schott ........................... 73/49.1 |
| 4,182,158 A * | 1/1980 | Culotta et al. ..................... 73/40 |
| 4,517,826 A * | 5/1985 | Cole et al. ......................... 73/40 |
| 4,620,738 A * | 11/1986 | Schwartz et al. .......... 414/752.1 |
| 4,858,975 A * | 8/1989 | Ogawa ............................. 279/3 |
| 4,979,390 A * | 12/1990 | Schupack et al. ................. 73/38 |
| 5,372,031 A * | 12/1994 | Harmand .......................... 73/40 |
| 5,374,090 A * | 12/1994 | Goff ................................ 294/185 |
| 5,559,282 A * | 9/1996 | Knight et al. ..................... 73/40 |
| 5,783,754 A * | 7/1998 | MacPherson .............. 73/862.03 |
| 6,232,578 B1 * | 5/2001 | Klebanoff et al. ............ 219/228 |
| 6,393,896 B1 * | 5/2002 | Fan .................................... 73/40 |
| 6,578,407 B1 | 6/2003 | McTaggart |
| 6,591,661 B2 * | 7/2003 | Davey .............................. 73/38 |
| 6,640,616 B2 * | 11/2003 | Holt .................................. 73/40 |
| 6,823,719 B2 * | 11/2004 | Poblete ............................ 73/46 |
| 6,826,957 B2 * | 12/2004 | Martone et al. ........... 73/40.5 R |
| 7,059,173 B2 * | 6/2006 | Babineau et al. ............. 73/32 R |
| 7,543,868 B1 * | 6/2009 | Mongan ....................... 294/186 |
| 7,624,624 B2 * | 12/2009 | Meskouri et al. ............. 73/49.7 |
| 2003/0217588 A1 * | 11/2003 | Jalbert et al. ..................... 73/38 |
| 2008/0163675 A1 * | 7/2008 | Hsu .................................. 73/40 |

* cited by examiner

*Primary Examiner* — David A. Rogers

(74) *Attorney, Agent, or Firm* — VanOphem & VanOphem, PC

(57) ABSTRACT

An apparatus for checking or monitoring a vacuum drawn by a suction cup used in connection with a material handling system. The apparatus includes a faceplate and a handle connected to the faceplate. The handle includes a vacuum gauge wherein a passageway extends from the vacuum gauge to the faceplate.

5 Claims, 3 Drawing Sheets

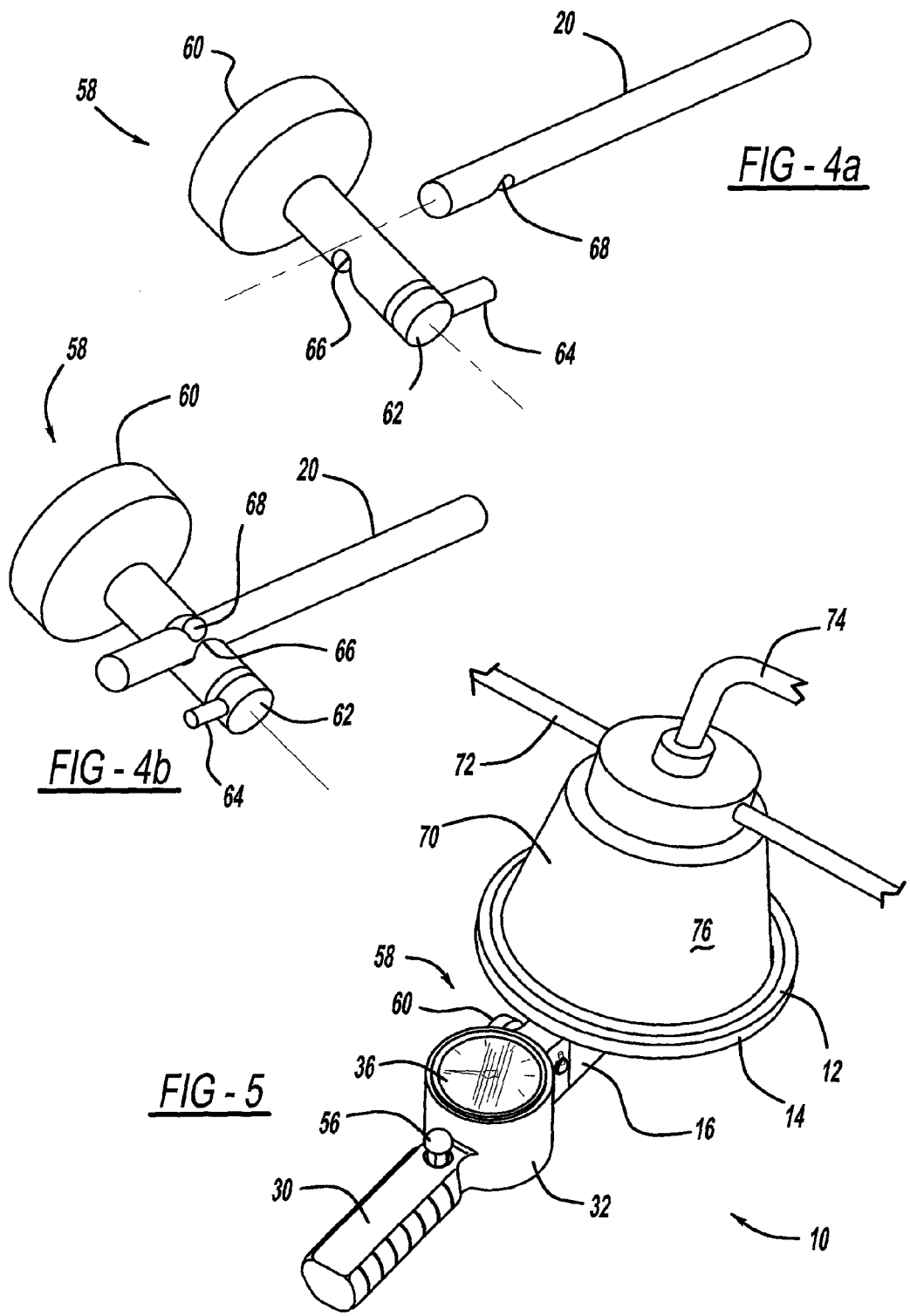

HANDHELD VACUUM TEST FIXTURE AND METHOD OF MONITORING VACUUM CUP DIFFERENTIAL PRESSURE

CROSS-REFERENCE TO RELATED APPLICATIONS

This application is a continuation-in-part of U.S. Provisional Application Ser. No. 61/061,331 filed on Jun. 13, 2008.

BACKGROUND OF THE INVENTION

1. Field of the Invention

The present invention is related to an apparatus for monitoring vacuum levels; and more specifically, to an apparatus suitable for monitoring the vacuum level exerted by any type of vacuum gripper or suction cup.

2. Description of Related Art

Vacuum grippers or lifters are a reliable, efficient and ergonomic means of handling any smooth, nonporous material, including glass, metal, stone, concrete, plastic and laminates. For example, it is known to provide material handling systems with vacuum cups that engage a substantially flat object or panel to lift and move the object to a desired location. The vacuum cup(s) are brought into engagement with the object, and a vacuum source communicating with the cup is actuated to create a vacuum between the object and the vacuum cup such that the object is retained by the cup. The object is then repositioned and either stripped from the vacuum cup while the vacuum source remains operational or the vacuum source is deactivated to release the object from the vacuum cup.

During lifting and transportation, it is important that the object is securely held by the material handling system and therefore important that the vacuum level is sufficient to ensure that the object remains secured to the pick and place material handling system. As the device is used, the cups, including the sealing lip located about the peripheral edge of the cup, wear and fail to tightly seal the vacuum cup against the object. Further the seal can easily become damaged due to the harshness of the environment resulting in the creation of a leak in the seal. Since the vacuum is generated by the supply of an air flow in a rubber tube line, any portion of the supply line is also subject to damage thereby creating potential leaks in the line that supplies the air resulting in an insufficient supply of air to create the necessary vacuum to pick up the workpiece with the material handling system. In addition, a material handling system may have multiple cups, for example four or more vacuum cups all connected to a single vacuum source. Accordingly, once the cups engage an object, such as an automotive panel, actuation of the vacuum source draws a vacuum equally on all four cups. However, if one of the cups is not properly sealed or damage to the supply line has created a leak, a disproportionate amount of the vacuum escapes through the unsealed cup and/or leaky supply line. Thus, even if the remaining cups are properly sealed against the automotive panel, the resultant vacuum may not have sufficient strength to lift and transfer the panel. The problem generally results in down time of the production line associated with the material handling system that leaks until such leaks can be corrected.

SUMMARY OF THE INVENTION

According to a preferred embodiment of the present invention, there is provided an apparatus for checking the vacuum level at a vacuum cup or suction cup of a vacuum actuated material handling system. The apparatus includes a faceplate, a vacuum gauge and a handle.

In one form of the invention, the faceplate is removably secured to the handle whereby a plurality of different forms and sized faceplates may be used with the same handle and vacuum gauge combination such that the faceplate is complementary to the form of the vacuum suction cup. In a further embodiment, the apparatus includes a vacuum release button or member enabling air flow from the vacuum cup and faceplate to a vent to atmosphere and bleed the vacuum to ambient conditions whereby the work apparatus can be removed from the vacuum cup.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4a is an exploded view of one embodiment of a detent apparatus used to secure the faceplate to the handle of the present invention;

FIG. 4b is an assembled view of one embodiment of the detent apparatus used to secure the faceplate to the handle of the present invention; and FIG. 5 is a perspective side view of the apparatus according to the embodiment of the present invention illustrated in FIG. 1 used in connection with a suction cup of a material handling system.

DETAILED DESCRIPTION OF THE PREFERRED EMBODIMENTS

The following description of the preferred embodiment(s) is merely exemplary in nature and is in no way intended to limit the invention, its application, or uses.

Figure 1:
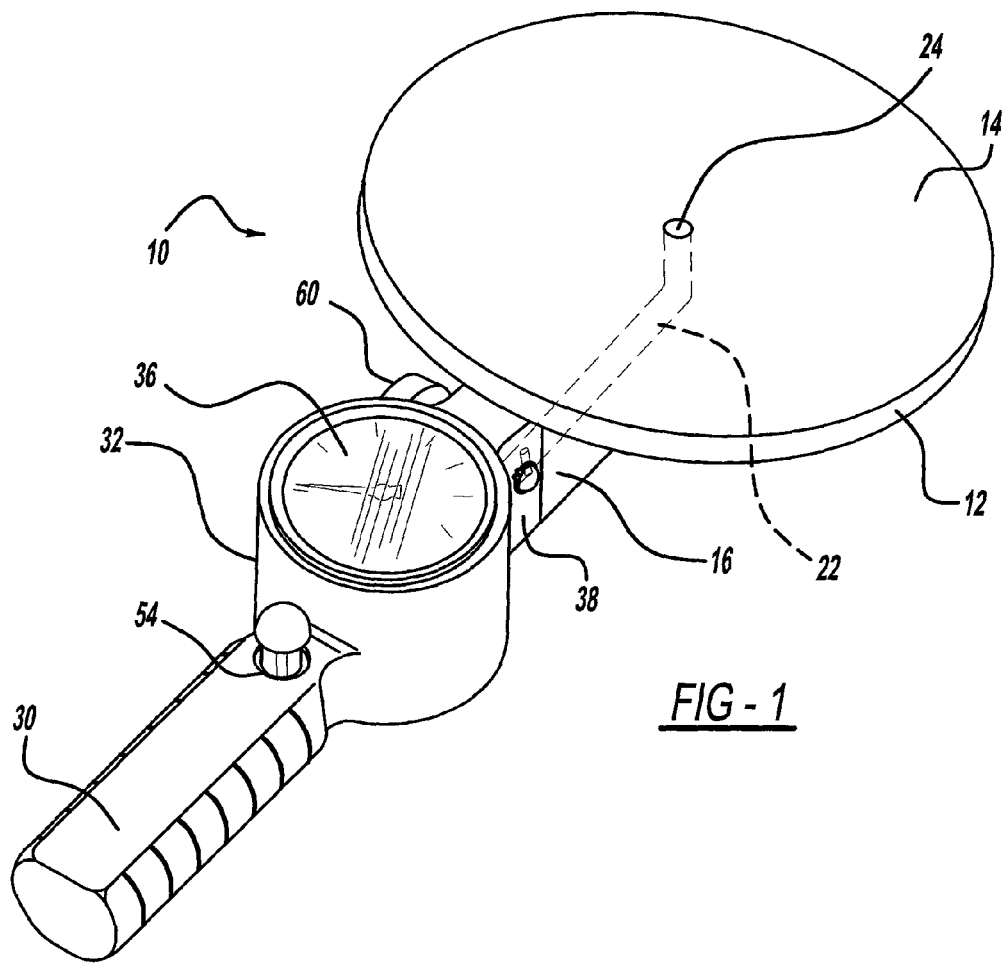
FIG. 1 is a perspective side view of the apparatus according to an embodiment of the present invention.
Figure 3:
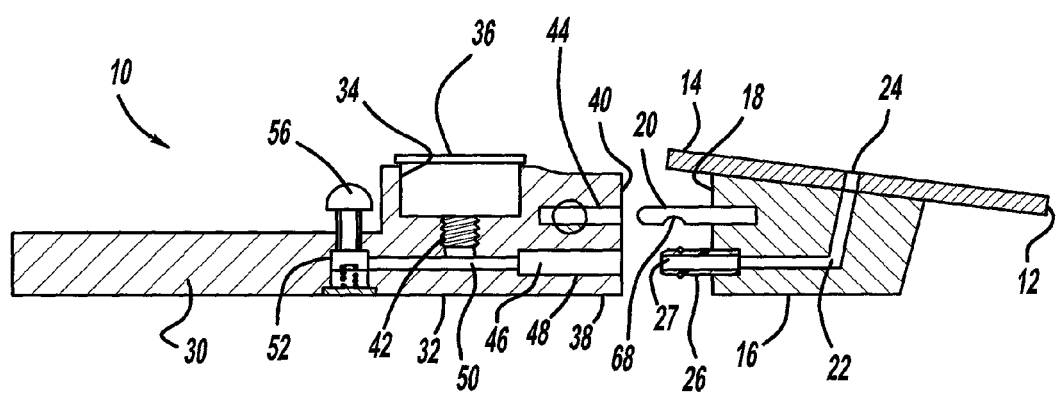
FIG. 3 is a sectional side view of the apparatus as shown by the section line in FIG. 2 according to an embodiment of the present invention.
Figure 2:
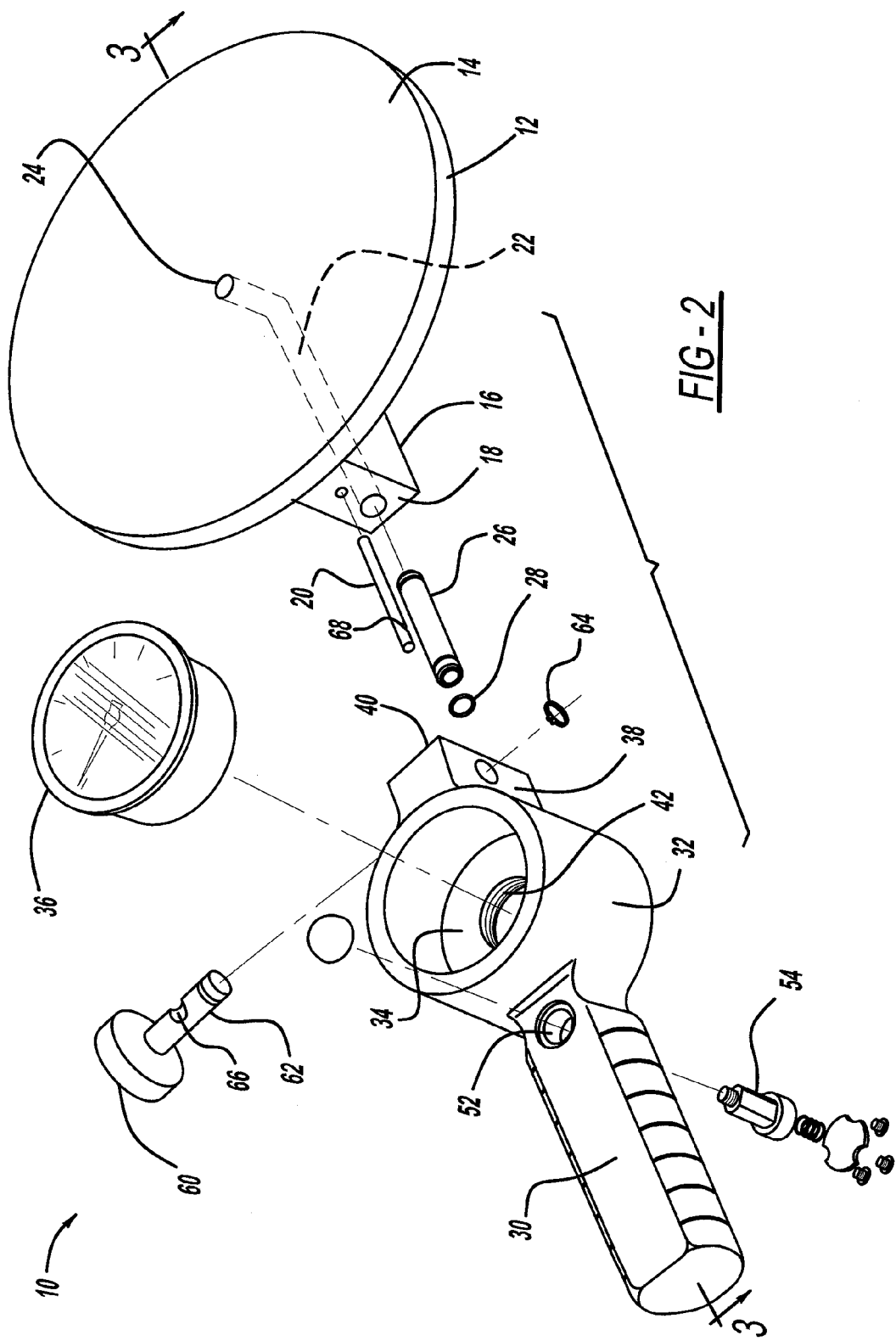
FIG. 2 is an exploded perspective view of the present invention illustrated in FIG. 1.

FIGS. 1-3 illustrate one embodiment of the inventive apparatus, seen generally at 10, for checking or monitoring the vacuum drawn by a vacuum cup used in connection with a material handling system having a vacuum cup and a vacuum source connected thereto. The apparatus 10 includes a faceplate 12 having a smooth, planar surface 14 sized to accept a vacuum cup. The faceplate 12 is secured to a base 16 by the use of a pipe thread nipple (not shown) attached to the underside of the faceplate 12 that is threaded into a pipe thread of a passageway within the base 16 that communicates with an aperture formed in the planar surface 14. The base 16 has a mounting surface 18. An attachment pin 20 extends outwardly from the mounting surface 18 of the base 16. The passageway 22 extends from the inlet aperture 24 formed in the planar surface 14 of the faceplate 12 (as shown in FIG. 4) to the mounting surface 18 in which is mounted a nipple 26 having an internal through-passage 27. As shown, an O-ring 28 is disposed about an outer circumferential surface of the nipple 26 so as to provide a sealed condition when the mounting surface 18 is attached to the mounting surface 40 of the head portion 38 of the handle 30.

The apparatus 10 further includes a handle 30 secured to a housing 32 forming a chamber 34 sized to receive a vacuum gauge 36 (shown in FIG. 2). Attached to the housing 32 opposite the handle 30 is a head portion 38. The head portion 38 includes a mounting surface 40 corresponding in shape and configuration to the mounting surface 18 of the base 16. The head portion 38 further includes an alignment bore 44 and through-bore 46 (shown in FIG. 2) with the alignment bore 44 sized to receive the attachment pin 20 and the through-bore 46 sized to receive the nipple 26. When the faceplate 12 is connected to the handle 30, the nipple 26 fits in the through-bore 46 whereby the O-ring 28 engages the interior surface 48 of the through-bore 46 and correspondingly seals the connection.

A passageway 50 extends from the through-bore 46 to a threaded aperture 42 in the chamber 34. An additional passageway 52 is located in the handle 30 and extends from the chamber 34 to a vacuum release port 54 that is selectively opened and closed by a spring-loaded knob 56 as shown in FIG. 1. When the faceplate 12 is attached to the handle 30, the inlet aperture 24 communicates with the vacuum release port 54 controlled by the spring-loaded knob 56 through the various passageways 50, 52.

The faceplate 12 as shown separates from the handle 30. This feature enables a plurality of various sizes, shapes, and configurations of faceplates to be used with a single handle 30 and vacuum gauge 36 combination. As illustrated, a detent lock mechanism 58, see FIG. 4a, operates to engage the attachment pin 20 and secure the faceplate 12 to the handle 30. Various types of detent mechanisms are suitable for use, and FIG. 4a illustrates one type thereof using a knob 60 connected to a shaft 62 rotatably secured on the side of the head portion 38. The shaft 62 has a locking pin 64 secured on one end thereof opposite the knob 60. The shaft 62 further includes a recessed portion 66 similar to the recessed portion 68 located on the attachment pin 20. As shown in FIG. 4b, the recessed portion 66 of the shaft 62 is positioned by rotation of the knob 60 of the detent lock mechanism 58 such that it cradles the attachment pin 20, the faceplate 12 can be removed from the handle 30. However when the recessed portion 66 of the shaft 62 is rotated by the knob 60 such that it does not cradle the diameter of the attachment pin 20, the outer diameter of the shaft 62 is then positioned in the recessed portion 68 of the attachment pin 20 whereby the detent mechanism 58 locks the faceplate 12 to the handle 30.

Turning now to FIG. 5, there is shown the apparatus 10 in use with a suction cup 70 attached to a frame or gantry 72 of a material handling device. A pneumatic line 74 connects the suction cup 70 to a vacuum source. Accordingly, in operation, the faceplate 12 is positioned against the suction cup 70; when a vacuum is drawn through the pneumatic line 74 the faceplate 12 is pulled or drawn up against the suction cup 70. The inlet aperture 24 in the faceplate 12 communicates with the area/chamber 76 under the suction cup 70 whereby a corresponding vacuum is drawn in the chamber 34 through a threaded pipe nipple on the vacuum gage that is mounted into a threaded aperture 42 of the through-bore 46 with the vacuum level being displayed on the vacuum gauge 36. It is contemplated that individual suction cups can be monitored while a continuous vacuum is being drawn through the pneumatic line 74. Accordingly, in order to remove the faceplate 12 from the suction cup 70, the knob 60 can be pressed or actuated to overcome the force of the spring mounted in the bottom of the spring loaded release port to open the vacuum release port 54 allowing atmospheric pressure to travel through the various passageways 50, 52 to the area/chamber 76 under the suction cup 70 enabling release of the faceplate 12 from the suction cups 70.

Accordingly, the present invention provides an apparatus whereby the vacuum generated at individual suction cups of a material handling apparatus can be easily monitored to determine the level of vacuum generated to correspondingly identify any leaks and worn or damaged suction cups.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A handheld vacuum monitoring apparatus comprising:
   a base member having
     a faceplate mounting surface;
     a handle mounting surface; and
     a first passage having an inlet port on said faceplate mounting surface and an outlet port on said handle mounting surface;
   a handle having
     a handle grip at one end thereof;
     a mounting face at an opposite end thereof; and
     a housing member interposed said handle grip and said mounting face;
   means for mounting said base member to said mounting face of said handle, said means for mounting selectively locking said handle to said base member;
   said handle further comprising an inner passage having an inlet port at said mounting face of said opposite end and an outlet port interposed said housing member and said handle grip at said one end;
   a faceplate mounted to said faceplate mounting surface of said base member, said faceplate having a planar surface and a through-passage aperture therein, said through-passage aperture having an outlet port sealingly mounted to said inlet port of said faceplate mounting surface and an inlet port on said planar surface of said faceplate;
   said housing member of said handle having a peripheral sidewall upstanding from a bottom wall to define a chamber, said bottom wall of said chamber having an opening communicating with said inner passage of said handle;
   means for selectively sealing said outlet port interposed said housing member and said handle grip at said one end; and
   means for measuring a vacuum attached to said opening in said bottom wall of said chamber;
   whereby when said base member is sealingly mounted and locked to said mounting face of said opposite end of said handle and said faceplate is sealingly attached to said faceplate mounting surface of said base member, a vacuum sensed at said through-passage aperture is communicated through said first passage of said base plate, said inner passage of said handle and said though-passage aperture of said bottom wall of said chamber to a vacuum measuring device mounted in said opening communicating with said inner passage of said handle when said means for selectively sealing said outlet port interposed said housing member and said handle grip at said one end is closed such that said sensed vacuum can be vented to atmosphere by selectively opening said outlet port interposed said housing member and said housing grip at said one end of said handle.

2. The apparatus as claimed in claim 1 further comprising means for mounting said faceplate to said faceplate mounting surface.

3. A handheld vacuum monitoring apparatus comprising:
a handle having one end and an opposite end;
means for measuring and displaying a vacuum mounted to said opposite end of said handle, said means for measuring further comprising:
housing means integral with said opposite end of said handle for containing said means for measuring a vacuum; and
means for coupling extending from said housing means in a direction away from said handle;
means for receiving a suction cup device of a material handling system, said means for receiving having a planar surface at one end thereof and a mounting surface at another end thereof, said suction cup device sealingly communicating with said planar surface to create a seal thereat, said mounting surface complementary to said coupling means extending from said housing means of said means for measuring and dispensing a vacuum;
a through-passage having an inlet at said planar surface of said means for receiving a suction cup device and an outlet located on said handle adjacent said housing means, said through-passage communicating vacuum sensed along said planar surface within said suction cup through said through-passage along said receiving means, said mounting surface, said coupling means, said housing means, said means for measuring, and said handle to said outlet; and
means for selectively closing said outlet whereby when said outlet is closed, said vacuum sensed at said planar surface within said suction cup is communicated to said measuring and displaying means so as to monitor the vacuum within said suction cup and further when said outlet is opened said vacuum is vented to atmosphere to enable removal of said suction cup from said planar surface.

4. The apparatus as claimed in claim 3 further comprising means for sealingly mounting said planar surface to said inlet of said through-passage.

5. The apparatus as claim in claim 3 wherein said means for selectively closing said outlet further comprises:
a vacuum release blind passage communicating at one end with said additional passageway extending from said handle to said vacuum release port and at an opposite end with said vacuum release port;
a spring-loaded seal mounted in said vacuum release blind passage to normally close said passage so as to maintain said vacuum sensed along said planar surface; and
means for overcoming said spring-loaded seal force so as to selectively enable venting said vacuum release blind passage to atmosphere.

* * * * *